United States Patent
Kim

(10) Patent No.: US 10,959,118 B2
(45) Date of Patent: Mar. 23, 2021

(54) METHOD AND DEVICE FOR PERFORMING MEASUREMENT IN WIRELESS COMMUNICATION SYSTEM

(71) Applicant: LG ELECTRONICS INC., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 174 days.

(21) Appl. No.: 16/070,040

(22) PCT Filed: Feb. 2, 2017

(86) PCT No.: PCT/KR2017/001096
§ 371 (c)(1),
(2) Date: Jul. 13, 2018

(87) PCT Pub. No.: WO2017/135684
PCT Pub. Date: Aug. 10, 2017

(65) Prior Publication Data
US 2019/0021020 A1    Jan. 17, 2019

Related U.S. Application Data

(60) Provisional application No. 62/290,428, filed on Feb. 2, 2016.

(51) Int. Cl.
*H04W 24/00* (2009.01)
*H04W 24/10* (2009.01)
(Continued)

(52) U.S. Cl.
CPC ........... *H04W 24/10* (2013.01); *H04W 24/08* (2013.01); *H04W 36/08* (2013.01); *H04W 48/16* (2013.01);
(Continued)

(58) Field of Classification Search
CPC . H04W 24/10; H04W 48/16; H04W 52/0216; H04W 52/0229; H04W 76/27;
(Continued)

(56) References Cited

U.S. PATENT DOCUMENTS

2007/0224992 A1* 9/2007 Dalsgaard ............. H04W 36/12
455/436
2013/0040640 A1   2/2013 Chen et al.
(Continued)

FOREIGN PATENT DOCUMENTS

| WO | 2015012654 | 1/2015 |
|---|---|---|
| WO | 2015122665 | 8/2015 |
| WO | 2015143244 | 9/2015 |

OTHER PUBLICATIONS

Ericsson, "Random Access for NB-IOT," R2-160470, 3GPP TSG RAN WG2 Meeting NB-IoT, Budapest Hungary, Jan. 13, 2016, see section 2.2.
(Continued)

*Primary Examiner* — Mounir Moutaouakil
(74) *Attorney, Agent, or Firm* — Dentons US LLP

(57) ABSTRACT

Provided is a method for a terminal performing a measurement in a wireless communication system, and a device supporting same. The terminal comprises: determining a coverage enhancement (CE) level thereof; receiving a legacy measurement configuration and a measurement activity configuration; and on the basis of the determined CE level, performing a measurement according to any one of the legacy measurement configuration or the measurement activity configuration, wherein the legacy measurement configuration may be a measurement configuration applying to a terminal in a normal coverage region, and the measurement activity configuration may be a measurement configuration applying to a terminal in a CE region.

11 Claims, 11 Drawing Sheets

(51) Int. Cl.
*H04W 48/16* (2009.01)
*H04W 52/02* (2009.01)
*H04W 24/08* (2009.01)
*H04W 76/27* (2018.01)
*H04W 36/08* (2009.01)
*H04L 12/26* (2006.01)
*H04W 4/70* (2018.01)

(52) U.S. Cl.
CPC ... *H04W 52/0216* (2013.01); *H04W 52/0229* (2013.01); *H04W 76/27* (2018.02); *H04L 43/00* (2013.01); *H04W 4/70* (2018.02)

(58) Field of Classification Search
CPC ....... H04W 36/08; H04W 24/08; H04W 4/70; H04L 43/00; Y02D 30/70
See application file for complete search history.

(56) References Cited

U.S. PATENT DOCUMENTS

| | | | |
|---|---|---|---|
| 2016/0242206 A1* | 8/2016 | Ohlsson | H04W 72/1289 |
| 2016/0286448 A1* | 9/2016 | Chapman | H04W 36/14 |
| 2017/0214495 A1* | 7/2017 | Golitschek Edler von Elbwart | H04L 1/1861 |
| 2017/0238302 A1* | 8/2017 | Futaki | H04W 4/70 370/329 |
| 2018/0007597 A1* | 1/2018 | Futaki | H04W 36/00837 |
| 2019/0261155 A1* | 8/2019 | Mochizuki | H04W 4/06 |

OTHER PUBLICATIONS

LG Electronics Inc., "Measurement Rules for Cell Reselection in NB-IoT," R2-160528, 3GPP TSG RAN WG2 NB-IoT, Budapest, Hungary, Jan. 13, 2016, see section 2.

* cited by examiner

METHOD AND DEVICE FOR PERFORMING MEASUREMENT IN WIRELESS COMMUNICATION SYSTEM

CROSS-REFERENCE TO RELATED APPLICATIONS

This application is the National Stage filing under 35 U.S.C. 371 of International Application No. PCT/KR2017/001096, filed on Feb. 2, 2017, which claims the benefit of U.S. Provisional Application No. 62/290,428 filed on Feb. 2, 2016, the contents of which are all hereby incorporated by reference herein in their entirety.

BACKGROUND OF THE INVENTION

Field of the Invention

The present invention relates to a wireless communication system, and more particularly, to a method of performing a measurement by a user equipment (UE), and an apparatus supporting the method.

Related Art

3GPP (3rUEd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Is: (IoT Internet of Things) What are all the things, the future information and communication infrastructure and services in the future to communicate directly with each other are connected to the Internet, Internet of Things. The reason for the Internet of Things, but the second one connected community to improve the quality of life based on increased productivity and, ultimately, it is critical to achieve because of the central nervous system for the infrastructure of the country itself, and further the human race and the planet. Objects Internet has largely be divided into a cellular mobile communication based on the IoT and the non-cellular based IoT.

CIoT Internet of Things refers to the cellular mobile communications infrastructure. In order to support cellular services based on the IoT effectively it should be intermittent and effectively convey the MTC traffic for a packet in the form of Short sporadically. In addition, it must be accepted by the delay information transmitted immediately without going through the separate channel allocation procedure (grant-free form) data packet in the case of application services with real-time constraints. Furthermore, to a large random access for IoT services to reduce cost and power consumption of the device, increase the coverage, it is necessary to improve the efficiency of the process and the capacity of the random access.

SUMMARY OF THE INVENTION

When a normal UE performs inter-frequency cell reselection, since the inter-frequency cell reselection is not performed based on a frequency priority provided by a network, the UE may not perform a measurement for all neighbor frequencies. However, a UE not considering the frequency priority in the cell reselection may have to perform a measurement for all neighbor cells. For example, if it is regarded that reference signal received power (RSRP)/reference signal received quality (RSRQ) measured by the UE in a coverage enhancement area is less than a threshold, the UE must continuously perform a neighbor cell measurement for all neighbor frequencies. To minimize battery consumption, it may be necessary to provide an effective measurement method and an apparatus supporting the method.

An embodiment provides a method of performing a measurement by a UE in a wireless communication system. The UE may determine a coverage enhancement (CE) level of the UE, receive a legacy measurement configuration and a measurement activity configuration, and perform the measurement according to any one of the legacy measurement configuration and the measurement activity configuration on the basis of the determined CE level. The legacy measurement configuration may be a measurement configuration applied to a UE in a normal coverage. The measurement activity configuration may be a measurement configuration applied to a UE in a CE area.

If the determined CE level is not 0, the measurement activity configuration may be applied.

The measurement activity configuration may include at least any one parameter among a measurement activity duration, a measurement inactivity duration, a measurement activity repetition period, and a measurement inactivity timer.

The parameter included in the measurement activity configuration may be provided per CE level.

The parameter included in the measurement activity configuration may be provided as a single value regardless of the CE level. The UE may scale the parameter on the basis of the determined CE level of the UE.

The parameter included in the measurement activity configuration may be provided per mobility state of the UE.

The parameter included in the measurement activity configuration may be provided as a single value regardless of a mobility state of the UE. The UE may scale the parameter on the basis of the mobility state of the UE.

If the measurement activity configuration includes the measurement activity duration and the measurement inactivity duration, the measurement may be performed only during the measurement activity duration.

If the measurement activity configuration includes a measurement inactivity timer, the measurement may be interrupted while the measurement inactivity timer is running. The inactivity timer may start when the measurement completes.

The measurement may be at least any one of a measurement for a neighbor cell, a measurement for a neighbor frequency, a measurement for a serving cell, and a measurement for a serving frequency.

The measurement activity configuration may be a measurement configuration applied to a NarrowBand-IoT (NB-IoT) UE.

Provided is a UE for performing a measurement in a wireless communication system. The UE may include: a memory; a transceiver; and a processor operatively coupled to the memory and the transceiver. The processor may be configured to determine a CE level of the UE, control the transceiver to receive a legacy measurement configuration and a measurement activity configuration, and perform the measurement according to any one of the legacy measurement configuration and the measurement activity configuration on the basis of the determined CE level. The legacy measurement configuration may be a measurement configuration applied to a UE in a normal coverage, and the measurement activity configuration is a measurement configuration applied to a UE in a CE area.

A UE can effectively perform a measurement in terms of energy.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
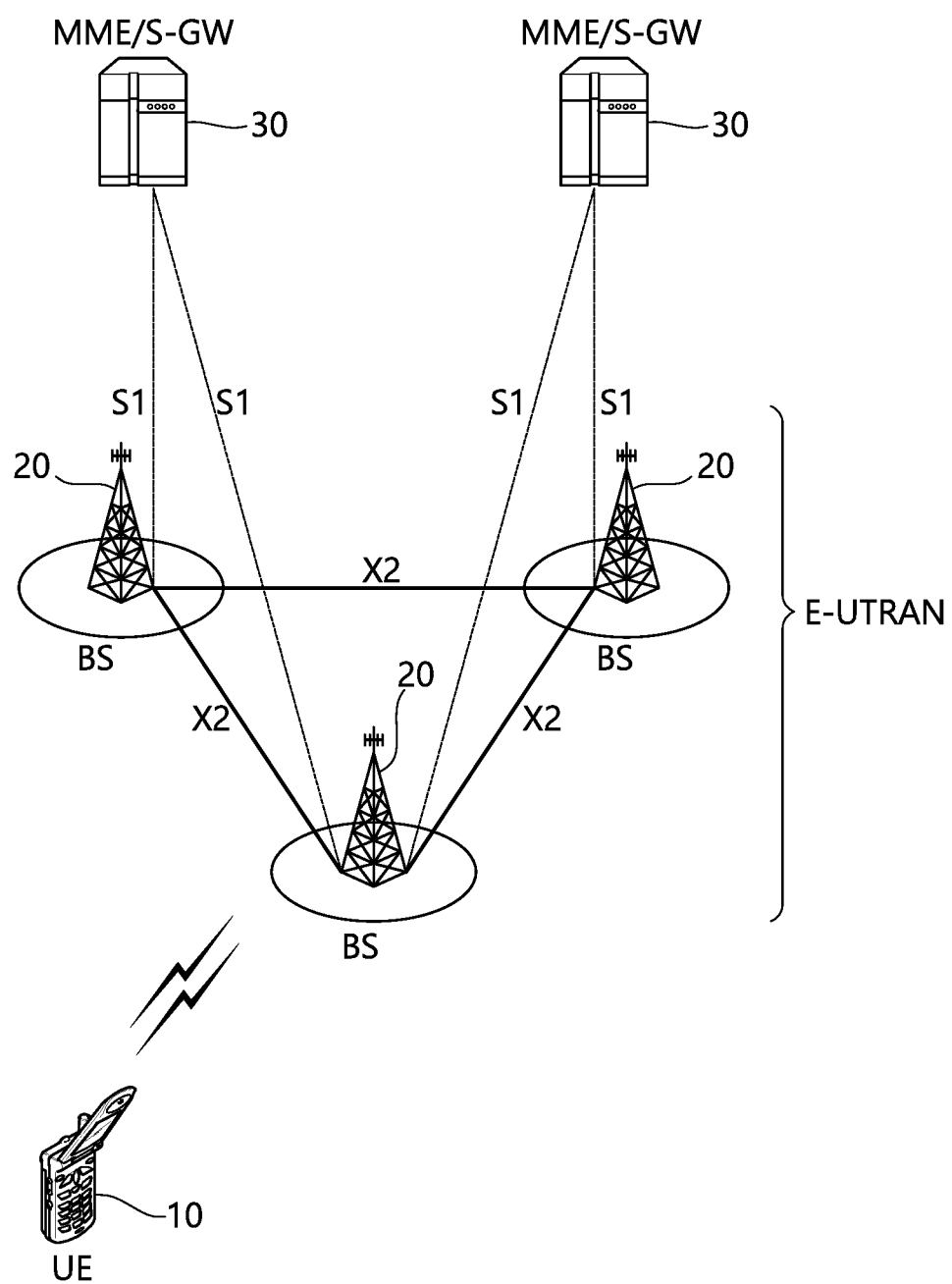
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
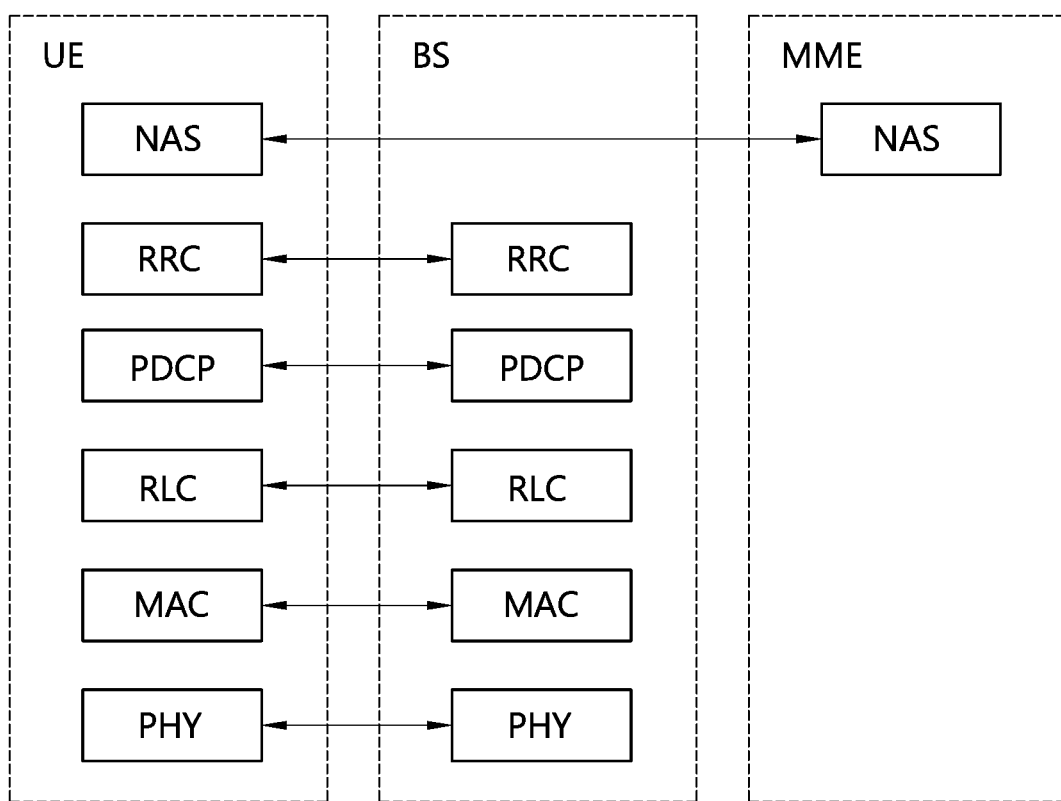
FIG. 2 shows a control plane of a radio interface protocol of an LTE system.
Figure 3:
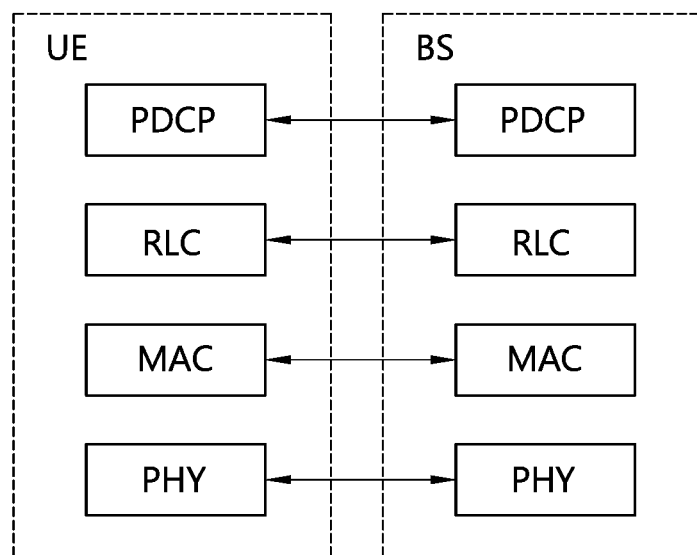
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
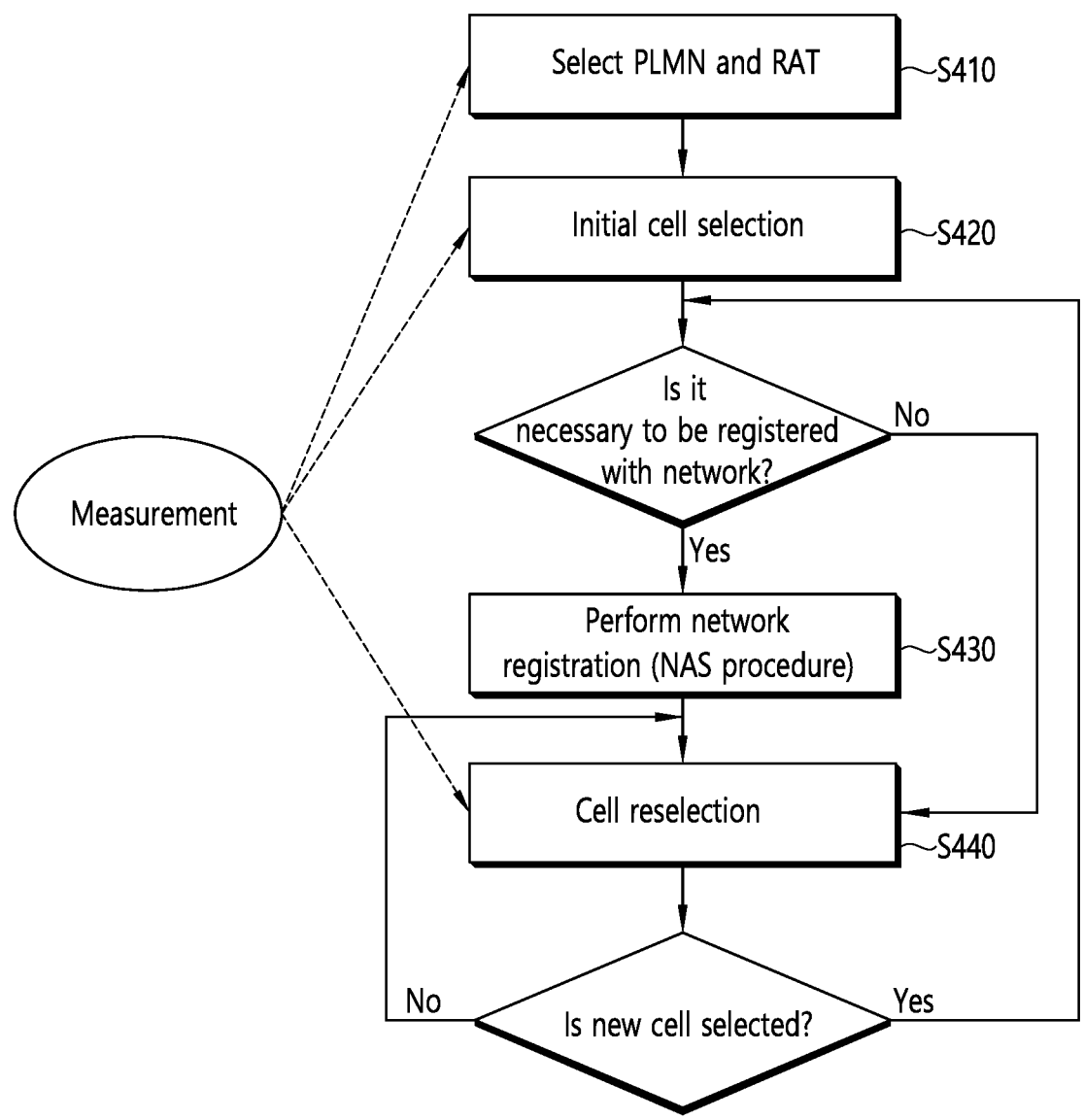
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Hereinafter, a Method and a Procedure of Selecting a Cell by a UE in a 3GPP LTE is Described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: A UE reselects a cell having a different center frequency from that of RAT, such as a cell on which the UE camps on Inter-RAT cell reselection: A UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured a UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide a UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide a UE with a cell reselection black list used in cell reselection. The UE does not perform cell reselection on a cell included in the black list.

Ranking Performed in a Cell Reselection Evaluation Process is Described Below.

A ranking criterion used to apply priority to a cell is defined as in Equation 1.

$$R_S = Q_{meas,s} + Q_{hyst}, R_n = Q_{meas,n} - Q_{offset} \quad \text{[Equation 1]}$$

In this case, Rs is the ranking criterion of a serving cell, Rn is the ranking criterion of a neighbor cell, Qmeas,s is the quality value of the serving cell measured by a UE, Qmeas,n is the quality value of the neighbor cell measured by UE, Qhyst is the hysteresis value for ranking, and Qoffset is an offset between the two cells.

In Intra-frequency, if a UE receives an offset "Qoffsets,n" between a serving cell and a neighbor cell, Qoffset=Qoffsets,n. If a UE does not Qoffsets,n, Qoffset=0.

In Inter-frequency, if a UE receives an offset "Qoffsets,n" for a corresponding cell, Qoffset=Qoffsets,n+Qfrequency. If a UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and a UE may alternately reselect the twos. Qhyst is a parameter that gives hysteresis to cell reselection so that UE is prevented from to alternately reselecting two cells.

A UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Hereinafter, a Cell Selection Criterion S Will be Described.

A UE may calculate the ranking of any cell satisfying a cell selection criterion S. The cell selection criterion may be defined by Equation 2.

$$Srxlev > 0 \text{ and } Squal > 0 \quad \text{[Equation 2]}$$

Srxlev denotes a cell selection RX level value (dB), which may be defined by Equation 3. Squal denotes a cell selection quality value (dB), which may be defined by Equation 4.

$$Srxlev = Qrxlevmeas - (Qrxlevmin + Qrxlevminoffset) - Pcompensation - Qoffsettem \quad \text{[Equation 3]}$$

Qrxlevmeas denotes a downlink reception power value used when the UE actually measures an RX channel, Qrxlevmin denotes a minimum downlink receiver power requirement level required to select a corresponding cell, Qrxlevminoffset denotes a threshold value to be added to Qrxlevmin only when the UE periodically searches for a public land mobile network (PLMN, or a communication vendor) having a higher priority while being present in a visited public land mobile network (VPLMN), Pcompensation is a threshold value considering an uplink channel state, and Qoffsettemp is an offset temporarily applied to the cell.

$$Squal = Qqualmeas - (Qqualmin + Qqualminoffset) - Qoffsettemp \quad \text{[Equation 4]}$$

Qqualmeas denotes a value obtained by calculating a ratio of received signal strength used when the UE actually measures a downlink RX channel and total noise actually measured. Qqualmin a minimum signal to noise ratio level required to select a corresponding cell. Qqualminoffset denotes a threshold value to be added to Qqualmin only when the UE periodically searches for a PLMN having a higher priority while being present in a VPLMN, and Qoffsettemp is an offset temporarily applied to the cell.

Referring to Equation 2 above, the cell selection criterion may be satisfied when both of Srxlev and Squal are greater than 0. That is, when both of the RSRP and RSRQ of the measured cell are greater than or equal to a specific level, the UE may determine the cell as a cell having a basic possibility for cell reselection. In particular, Squal is a parameter corresponding to the RSRQ. That is, Squal is a value calculated in association with quality of power rather than simply a value associated with a magnitude of power measured in the cell. The cell selection criterion may be satisfied in terms of quality of the cell if Squal>0. The cell selection criterion for the RSRQ may be satisfied only when the measured RSRQ is greater than or equal to a sum of Qqualmin and Qqualminoffset.

Figure 5:
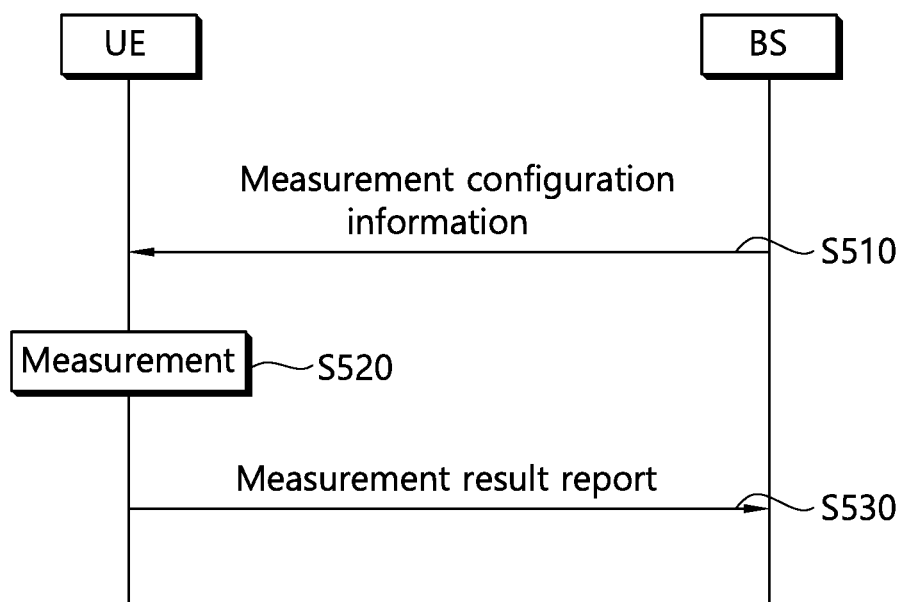
FIG. 5 shows a conventional method of performing measurement.

FIG. 5 shows a conventional method of performing measurement.

A UE receives measurement configuration information from a BS (S510). A message including the measurement configuration information is referred to as a measurement configuration message. The UE performs measurement based on the measurement configuration information (S520). If a measurement result satisfies a reporting condition included in the measurement configuration information, the UE reports the measurement result to the BS (S530). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
|---|---|
| Event A1 | Serving becomes better than threshold |
| Event A2 | Serving becomes worse than threshold |
| Event A3 | Neighboring becomes offset better than PCell/PSCell |
| Event A4 | Neighboring becomes better than threshold |
| Event A5 | PCell/PSCell becomes worse than threshold1 and neighboring becomes better than threshold2 |
| Event A6 | Neighboring becomes offset better than SCell |
| Event B1 | Inter RAT neighboring becomes better than threshold |
| Event B2 | PCell becomes worse than threshold1 and inter RAT neighboring becomes better than threshold2 |
| Event C1 | CSI-RS resource becomes better than threshold |
| Event C2 | CSI-RS resource becomes offset better than reference CSI-RS resource |

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measurement quality of the neighboring cell. The measured quality may include at least one of reference signal received power (RSRP) and reference signal received quality (RSRQ).

Hereinafter, Machine-Type Communication (MTC) Will be Described.

Figure 6:
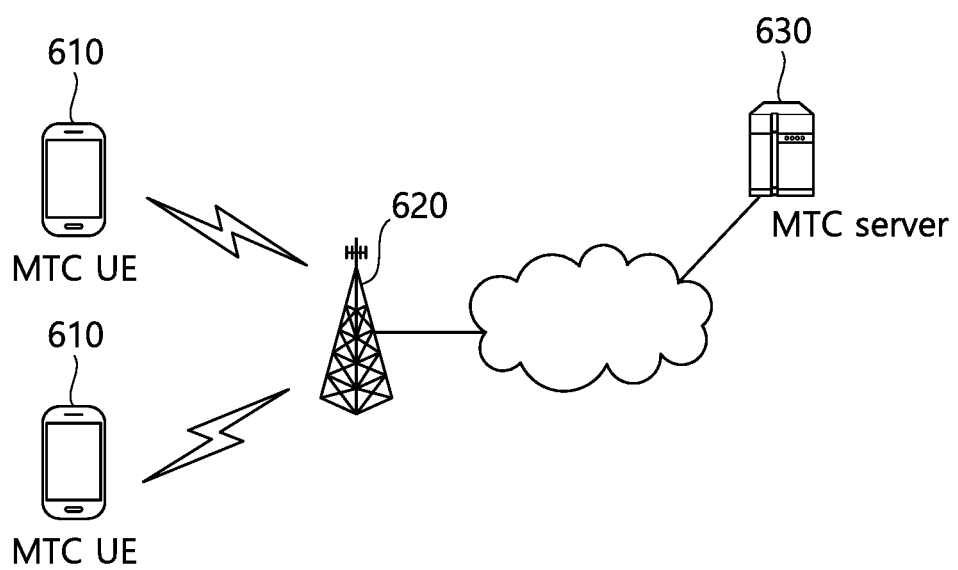
FIG. 6 shows an example of MTC.

FIG. 6 shows an example of MTC.

MTC refers to information exchange between MTC UEs 610 via a BS 620 without involving human interactions or information exchanges between an MTC UE 610 and an MTC server 630 via the BS. Services provided through MTC are differentiated from existing communication services requiring human intervention, and MTC provides a wide range of services, such as tracking, metering, payment, medical services, remote control, and the like. More specifically, services provided through MTC may include reading a meter, measuring a water level, utilizing a surveillance camera, reporting the inventory of a vending machine, and the like. Data communication-oriented low-cost/low-specification UEs that provide these services are referred to as an MTC UE or low complexity-type UE for convenience. A BS may determine whether a UE is an MTC UE based on the capability of the UE. In the present specification, an MTC UE, a low-complexity UE, a low-cost UE, and a UE Category 0 UE may be used with the same meaning, and a normal UE may be used to refer to a UE other than the listed UEs.

The MTC server 630 is an entity communicating with the MTC UE 610. The MTC server 630 runs an MTC application and provides an MTC-specific service to an MTC device. The MTC UE 610 is a wireless device that provides MTC communication and may be fixed or mobile.

Since an MTC UE has a small amount of data to transmit and is occasionally involved in uplink/downlink data transmission/reception, it is effective to reduce the cost of the UE and to decrease battery consumption thereof according to a low data transmission rate. The MTC UE is characterized by low mobility and thus has a hardly changing channel environment.

The MTC UE does not require a high-performance function and generally uses a small amount of data. The concept of UE Category 0 is introduced in order to manufacture a low-cost MTC UE. A UE category is a general number used in the 3GPP to indicate how much data a UE can process in a communication modem. Table 2 shows 3GPP UE categories.

TABLE 2

| UE Category | DL speed | UL speed |
| --- | --- | --- |
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 300 Mbps | 50 Mbps |
| 7 | 300 Mbps | 100 Mbps |
| 8 | 3 Gbps | 1.5 Gbps |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A UE Category 0 UE is allowed to process only 1 Mbps, making it possible to manufacture a modem without much effort and high costs, and may use only one antenna. Also, the UE Category 0 UE is allowed to perform transmission or reception only in a specified time, rather than simultaneously performing transmission and reception, and thus may operate in FDD in the same manner as in TDD. In addition, unlike in existing TDD, a sufficient switching time of about 1 ms may be assigned for a period of transition between transmission and reception, thereby remarkably reducing costs for hardware components, particularly in view of a modem and RF, overall.

MTC UEs may be installed not only in buildings and factories but also in coverage-limited places, for example, a basement. For instance, about 20% of MTC UEs supporting an MTC service, such as smart metering, may be installed in a poor 'deep indoor' environment, such as a basement. Thus, for successful MTC data transmission, it is necessary to increase the coverage of an MTC UE by about 20 dB as compared with the coverage of a conventional normal UE. Considering this situation, various coverage enhancement techniques are currently under discussion, such as a repetitive transmission method for an MTC UE by each channel/signal.

At present, in case of cell reselection, a UE may initiate a measurement on a neighbor cell when the UE fails in decoding several times or when RSRP/RSRQ of a serving cell, measured by the UE, is lower than a threshold. However, when a normal UE performs inter-frequency cell reselection, since the inter-frequency cell reselection is not performed based on a frequency priority provided by a network, the UE may not perform a measurement for all neighbor frequencies. On the other hand, when a UE (e.g., an NB-IoT UE, an MTC UE in a coverage enhancement area, a normal UE in the coverage enhancement area) other than the normal UE performs the inter-frequency cell reselection, since the frequency priority in the inter-frequency cell reselection is not considered, the UE other than the normal UE must continuously perform a neighbor cell measurement for all neighboring cells. Therefore, for example, if it is regarded that RSRP/RSRQ measured by the UE in the coverage enhancement area is less than a threshold, the UE must continuously perform a neighbor cell measurement for all neighbor frequencies. To minimize battery consumption, it may be necessary to find a better cell in an energy efficient way. Hereinafter, a method of performing a measurement by a UE, and an apparatus supporting the method will be described according to an embodiment of the present invention.

In order to perform a measurement for neighbor cell/frequency in an energy efficient way, the UE may perform a neighbor cell measurement for cell reselection during a measurement activity duration. On the other hand, the UE may not perform the neighbor cell measurement during a measurement inactivity duration. The UE may be a UE which does not consider a frequency priority in a measurement for a neighbor cell/frequency. For example, the UE may be a UE in a coverage enhancement area, an MTC UE in the coverage enhancement area, or a NarrowBand IoT (NB-IoT). For convenience of explanation, the coverage enhancement area of the present specification may be referred to as a CE area.

Figure 7:
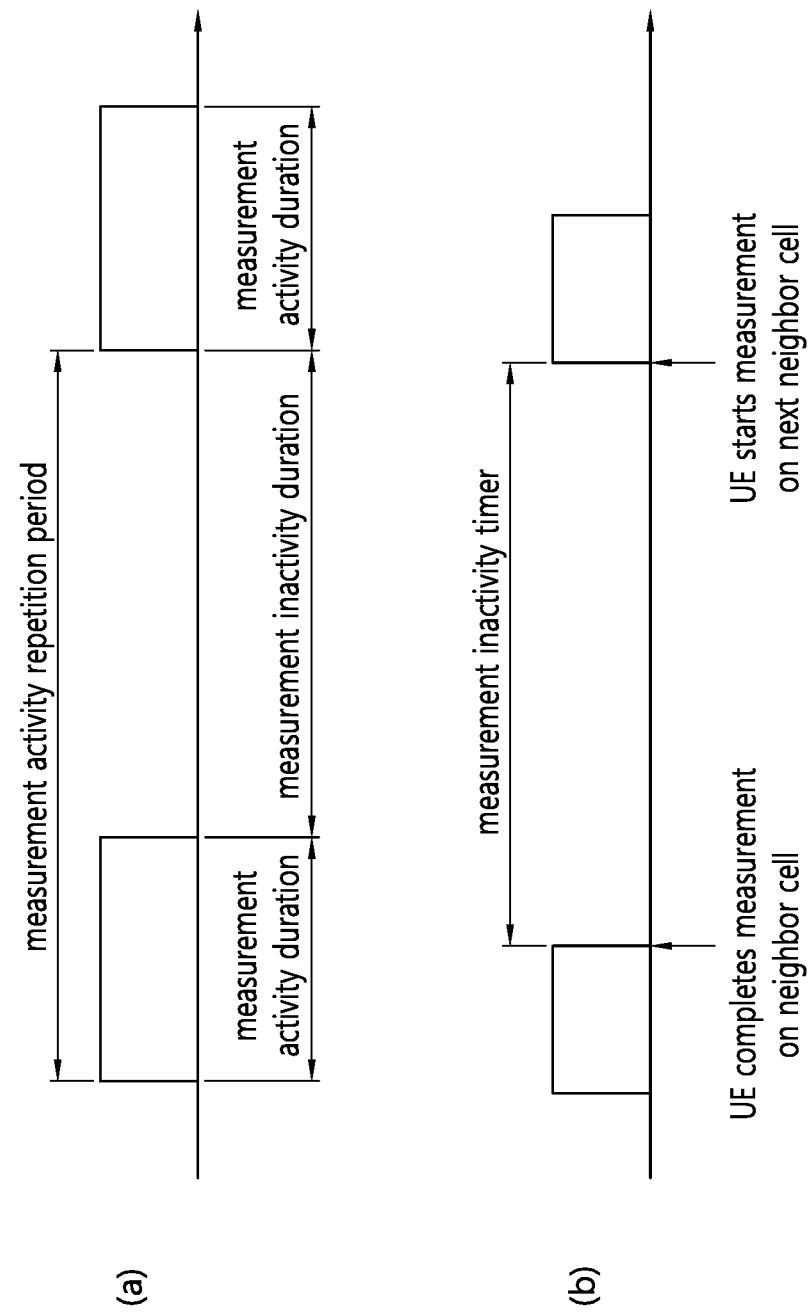
FIG. 7 is a drawing for describing a parameter included in a measurement activity configuration according to an embodiment of the present invention.

FIG. 7 is a drawing for describing a parameter included in a measurement activity configuration according to an embodiment of the present invention.

In case of a UE not considering a frequency priority for a neighbor frequency measurement, the UE may receive a measurement activity configuration from a serving cell. For example, the UE not considering the frequency priority for the neighbor frequency may be a UE in a coverage enhancement area, an MTC UE in the coverage enhancement area, or an NB-IoT.

The measurement activity configuration may include at least any one of a measurement activity duration, a measurement inactivity duration, a measurement activity repetition period, and a measurement inactivity timer.

Referring to FIG. 7(a), the measurement activity duration and the measurement inactivity duration may be provided to the UE. Alternatively, the measurement activity duration and the measurement activity repetition period may be provided to the UE. Alternatively, the measurement inactivity duration and the measurement activity repetition period may be provided to the UE. The UE may perform a neighbor cell measurement for all neighbor frequencies including a serving frequency during the measurement activity duration. On the other hand, the UE may not perform the neighbor cell measurement during the measurement inactivity duration.

Referring to FIG. 7(b), a measurement inactivity timer may be provided to the UE. When the UE completes the neighbor cell measurement, the UE may not perform the neighbor cell measurement while the measurement inactivity timer is running. When the measurement inactivity timer expires, the UE may start the neighbor cell measurement for all neighbor frequencies.

Hereinafter, a method of determining a coverage enhancement (CE) level by a UE will be described according to an embodiment of the present invention.

The UE may determine the CE level of a cell by comparing a measured RSRP/RSRQ result and a predetermined threshold.

In order for the UE to determine the CE level in a specific cell, a network may set an RSRP/RSRQ threshold value for one or more CE levels. For example, the network may perform signaling on a $0^{th}$ RSRP/RSRQ threshold for a CE level 0, a $1^{st}$ RSRP/RSRQ threshold for a CE level 1, a $2^{nd}$ RSRP/RSRQ threshold for a CE level 2, and a $3^{rd}$ RSRP/RSRQ threshold for a CE level 3. The CE level 0 may imply that there is no coverage enhancement for a measurement.

During a serving cell and a neighbor cell are measured, the UE may determine the CE level by comparing a threshold determined by the network and an RSRP/RSRQ result measured by the UE. If the measurement result is higher than the $0^{th}$ RSRP/RSRQ threshold, the UE may determine the CE level to 0. If the measurement result is lower than the $0^{th}$ RSRP/RSRQ threshold and higher than the $1^{st}$ RSRP/RSRQ, the UE may determine the CE level to 1. If the measurement result is lower than the $1^{st}$ RSRP/RSRQ threshold and higher than the $2^{nd}$ RSRP/RSRQ threshold, the UE may determine the CE level to 2. Likewise, if the measurement result is lower than the $2^{nd}$ RSRP/RSRQ threshold and higher than the $3^{rd}$ RSRP/RSRQ threshold, the UE may determine the CE level to 3.

Figure 8:
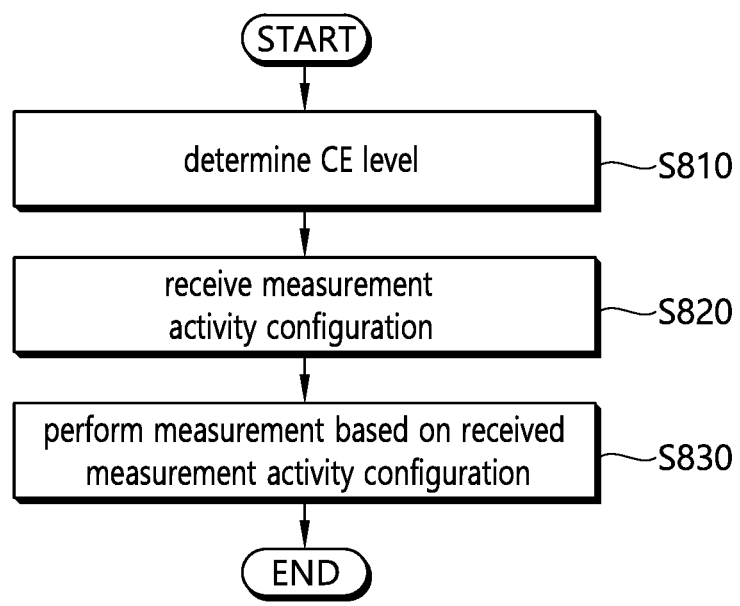
FIG. 8 shows a method of performing a measurement by a UE on the basis of a measurement activity configuration according to an embodiment of the present invention.

FIG. 8 shows a method of performing a measurement by a UE on the basis of a measurement activity configuration according to an embodiment of the present invention.

Referring to FIG. 8, in step S810, the UE may determine a coverage enhancement (CE) level. The CE level may be determined based on RSRP/RSRQ of a serving cell, measured by the UE. The UE may be in an RRC_CONNECTED mode. The UE may be in an RRC_IDLE mode.

In step S820, the UE may receive a measurement activity configuration from the serving cell. In addition, the UE may select information corresponding to the determined CE level of the UE from the measurement activity configuration. Alternatively, the UE may receive a measurement activity configuration corresponding to the determined CE level of the UE from the serving cell.

The measurement activity configuration may be provided per CE level. Alternatively, a single measurement activity configuration may be provided regardless of the CE level. If the single measurement activity configuration is provided regardless of the CE level, the UE may scale values of the measurement activity duration, measurement inactivity duration, measurement activity repetition period, and/or measurement inactivity timer on the basis of the CE level of the UE.

The measurement activity configuration may be provided per mobility state of the UE. Alternatively, a single measurement activity configuration may be provided regardless of the mobility state of the UE. If the single measurement activity configuration is provided regardless of the mobility state of the UE, the UE may scale values of the measurement activity duration, measurement inactivity duration, measurement activity repetition period, and/or measurement inactivity timer on the basis of the mobility state of the UE. The mobility state of the UE may be a speed of the UE. For example, if a high-mobility state is detected, the UE may use a measurement activity repetition period and/or a measurement inactivity timer lower than a determined value.

In step S830, the UE may perform a measurement based on the received measurement activity configuration. The measurement may be a measurement for a serving cell/frequency. The measurement may be a measurement for a neighbor cell/frequency. The measurement may be at least any one of an RSRP measurement, an RSRQ measurement, an RSSI measurement, and an SINR measurement.

If the measurement activity duration and the measurement inactivity duration are included in the received measurement activity configuration, the UE may perform a measurement for all neighbor frequencies including the serving frequency. On the other hand, the UE may not perform the measurement during the measurement inactivity duration. The measurement activity repetition period may be signaled instead of the measurement inactivity duration.

If the measurement inactivity timer is included in the received measurement activity configuration, the UE may start the measurement inactivity timer upon completion of the measurement for all neighbor frequencies. While the measurement inactivity timer is running, the UE may not perform the measurement. The measurement inactivity timer may be the same timer as a measurement prohibit timer. When the measurement inactivity timer expires, the UE may start the measurement for all neighbor frequencies.

The activation/deactivation of the measurement may be used only when the serving cell fulfils the condition of 'Srxlev>RSRP threshold'. The activation/deactivation of the measurement may be used only when the serving cell fulfils the condition of 'Squal>RSRQ threshold'. The activation/deactivation of the measurement may be used only when the serving cell fulfils the condition of 'Srxlev>RSRP threshold' and 'Squal>RSRQ threshold'. The RSRP/RSRQ threshold may be provided per CE level. Alternatively, a single RSRP/RSRQ threshold may be provided regardless of the CE level. If the single RSRP/RSRQ threshold is provided regardless of the CE level, the UE may scale the RSRP/RSRQ threshold on the basis of the determined CE level of the UE.

The activation/deactivation of the measurement may be used only when the UE is in a specific mobility state. For example, the specific mobility state may be a high mobility state. The high mobility state may imply a state in which the UE has a higher speed than a predefined threshold speed. For example, the specific mobility state may be a stationary state. The stationary state may imply a state in which the UE is stationary. The stationary state may imply a state in which the UE has a lower speed than the predefined threshold speed.

After the measurement is performed in step S830, the UE may calculate ranking of all cells. In addition, the UE may read necessary system information of a best ranked cell. If the best ranked cell is suitable for camping and a reselection condition is satisfied, the UE may reselect the best ranked cell. If the best ranked cell is not a suitable cell, the UE may reselect a second best cell.

Figure 9:
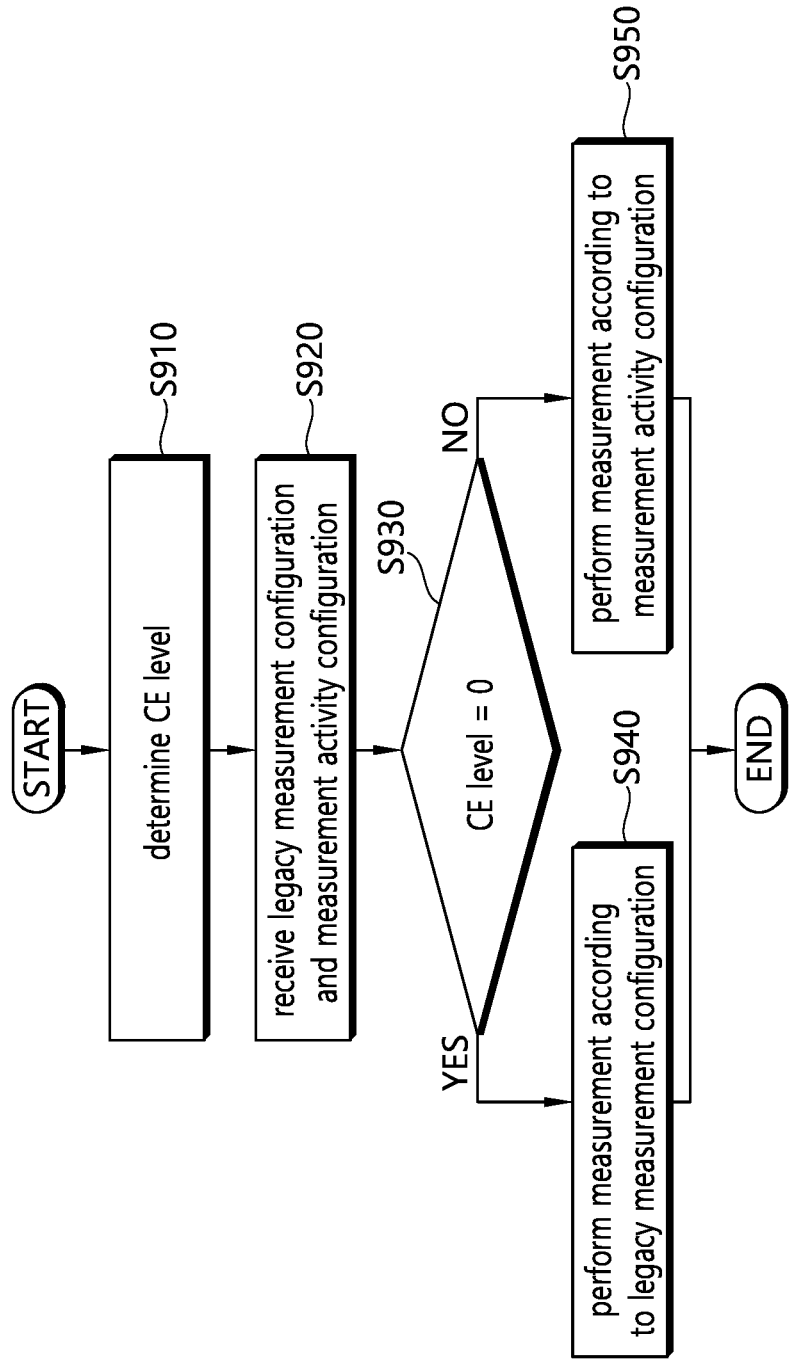
FIG. 9 shows a method of performing a measurement by a UE on the basis of a legacy measurement configuration or a measurement activity configuration according to an embodiment of the present invention.

FIG. 9 shows a method of performing a measurement by a UE on the basis of a legacy measurement configuration or a measurement activity configuration according to an embodiment of the present invention.

Referring to FIG. 9, in step S910, the UE may determine a CE level. The CE level may be determined on the basis of RSRP/RSRQ of a serving cell, measured by the UE. The UE may be in an RRC_CONNECTED mode. The UE may be in an RRC_IDLE mode. The UE may be a UE which does not consider a frequency priority in a frequency measurement. The UE may be an MTC UE. The UE may be an NB-IoT UE.

In step S920, the UE may receive the legacy measurement configuration and the measurement activity configuration from the serving cell. In addition, the UE may select information corresponding to the determined CE level of the UE from the legacy measurement configuration or the measurement activity configuration. If the UE is the NB-IoT UE, the legacy measurement configuration may not be selected by the NB-IoT regardless of the CE level.

The measurement activity configuration may be provided per CE level. Alternatively, a single measurement activity configuration may be provided regardless of the CE level. If the single measurement activity configuration is provided regardless of the CE level, the UE may scale values of a measurement activity duration, a measurement inactivity duration, a measurement activity repetition period, and/or a measurement inactivity timer on the basis of the CE level of the UE.

The measurement activity configuration may be provided per mobility state. Alternatively, the single measurement activity configuration may be provided regardless of the mobility state. If the single measurement activity configuration is provided regardless of the mobility state, the UE may scale values of a measurement activity duration, a measurement inactivity duration, a measurement activity repetition period, and/or a measurement inactivity timer on the basis of the mobility state of the UE. The mobility state of the UE may be a speed of the UE. For example, upon detecting a high mobility state, the UE may use a smaller measurement activity repetition period and/or measurement inactivity timer than a determined value.

In step S930, the UE may identify whether the determined CE level is 0.

In step S940, if the determined CE level is 0, the UE may perform a measurement on the basis of the legacy measurement configuration. If the UE is the NB-IoT UE, even if the determined CE level is 0, the UE may perform the measurement on the basis of the measurement activity configuration. In step S950, if the determined CE level is not 0, the UE may perform the measurement on the basis of the measurement activity configuration. The measurement may be a measurement on a serving cell/frequency. The measurement may be a measurement on a neighbor cell/frequency. The measurement may be at least any one of an RSRP measurement, an RSRQ measurement, an RSSI measurement, and an SINR measurement.

If the measurement activity duration and the measurement inactivity duration are included in the received measurement activity configuration, the UE may perform a measurement for all neighbor frequencies including the serving frequency. On the other hand, the UE may not perform the measurement during the measurement inactivity duration. The measurement activity repetition period may be signaled instead of the measurement inactivity duration.

If the measurement inactivity timer is included in the received measurement activity configuration, the UE may start the measurement inactivity timer upon completion of the measurement for all neighbor frequencies. While the measurement inactivity timer is running, the UE may not perform the measurement. The measurement inactivity timer may be the same timer as a measurement prohibit timer. When the measurement inactivity timer expires, the UE may start the measurement for all neighbor frequencies.

The activation/deactivation of the measurement may be used only when the serving cell fulfils the condition of 'Srxlev>RSRP threshold'. The activation/deactivation of the measurement may be used only when the serving cell fulfils the condition of 'Squal>RSRQ threshold'. The activation/deactivation of the measurement may be used only when the serving cell fulfils the condition of 'Srxlev>RSRP threshold' and 'Squal>RSRQ threshold'. The RSRP/RSRQ threshold may be provided per CE level. Alternatively, a single RSRP/RSRQ threshold may be provided regardless of the CE level. If the single RSRP/RSRQ threshold is provided regardless of the CE level, the UE may scale the RSRP/RSRQ threshold on the basis of the determined CE level of the UE.

The activation/deactivation of the measurement may be used only when the UE is in a specific mobility state. For example, the specific mobility state may be a high mobility state. The high mobility state may imply a state in which the UE has a higher speed than a predefined threshold speed. For example, the specific mobility state may be a stationary state. The stationary state may imply a state in which the UE is stationary. The stationary state may imply a state in which the UE has a lower speed than the predefined threshold speed.

After the measurement is performed based on the method proposed in the present specification, various reselection criteria may also be applied.

Figure 10:
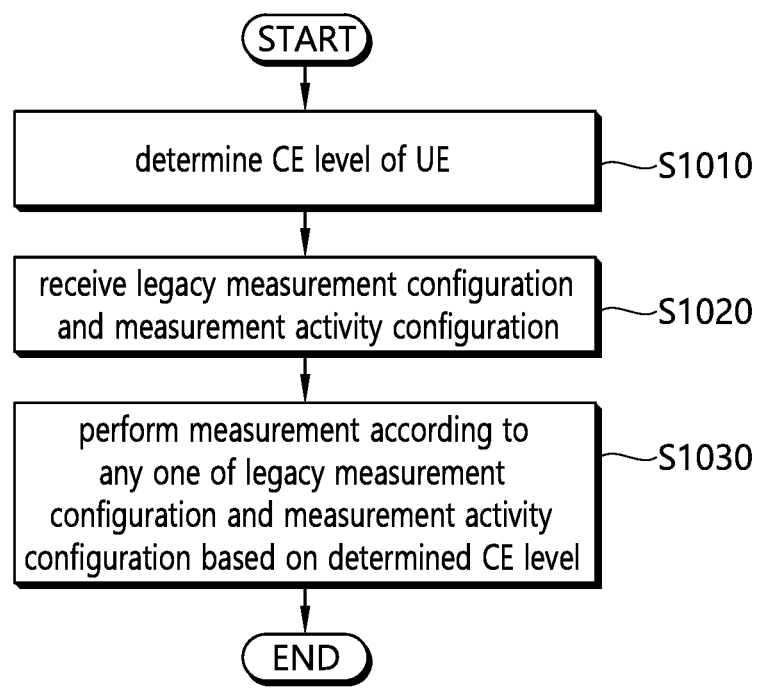
FIG. 10 is a block diagram showing a method of performing a measurement by a UE on the basis of a legacy measurement configuration or a measurement activity configuration according to an embodiment of the present invention.

FIG. 10 is a block diagram showing a method of performing a measurement by a UE on the basis of a legacy measurement configuration or a measurement activity configuration according to an embodiment of the present invention.

Referring to FIG. 10, in step S1010, the UE may determine a coverage enhancement (CE) level of the UE.

In step S1020, the UE may receive a legacy measurement configuration and a measurement activity configuration.

The legacy measurement configuration may a measurement configuration applied to a UE in a normal coverage, and the measurement activity configuration may be a measurement configuration applied to a UE in a CE area. Alternatively, the measurement activity configuration may be a measurement configuration applied to a NarrowB and IoT (NB-IoT) UE. The measurement activity configuration may include at least any one parameter among a measurement activity duration, a measurement inactivity duration, a measurement activity repetition period, and a measurement inactivity timer.

The parameter included in the measurement activity configuration may be provided per CE level. Alternatively, the parameter included in the measurement activity configuration may be provided as a single value regardless of the CE level. In this case, the UE may scale the parameter on the basis of the CE level of the UE.

The parameter included in the measurement activity configuration may be provided per mobility state of the UE. Alternatively, the parameter included in the measurement activity configuration may be provided as a single value regardless of a mobility state of the UE. In this case, the UE may scale the parameter on the basis of the mobility state of the UE.

In step S1030, the UE may perform the measurement according to any one of the legacy measurement configuration and the measurement activity configuration on the basis of the determined CE level.

If the determined CE level is not 0, the measurement activity configuration may be applied. If the measurement activity configuration includes the measurement activity duration and the measurement inactivity duration, the measurement may be performed only during the measurement activity duration. If the measurement activity configuration includes a measurement inactivity timer, the measurement is interrupted while the measurement inactivity timer is running. The inactivity timer may start when the measurement completes.

The measurement may be at least any one of a measurement for a neighbor cell, a measurement for a neighbor frequency, a measurement for a serving cell, and a measurement for a serving frequency.

Figure 11:
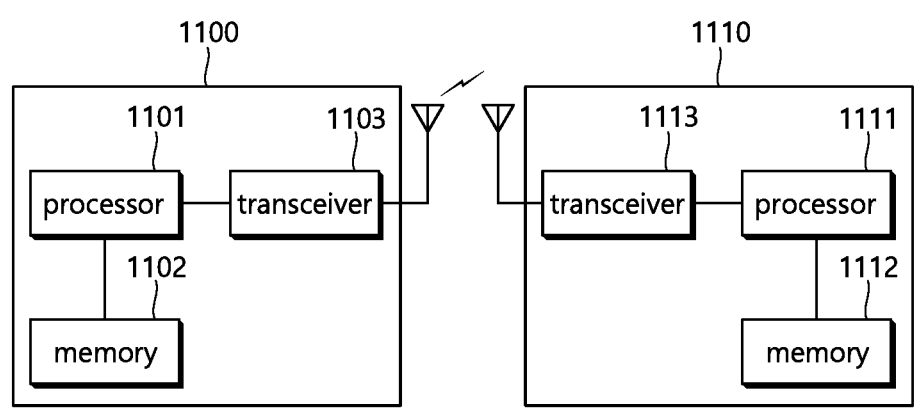
FIG. 11 is a block diagram illustrating a wireless communication system according to the embodiment of the present invention.

FIG. 11 is a block diagram illustrating a wireless communication system according to the embodiment of the present invention.

ABS 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the base station may be implemented by the processor 1101.

A UE 1110 includes a processor 1111, a memory 1112 and a transceiver 1113. The memory 1112 is connected to the processor 1111, and stores various information for driving the processor 1111. The transceiver 1113 is connected to the processor 1111, and transmits and/or receives radio signals. The processor 1111 implements proposed functions, processes and/or methods. In the above embodiment, an operation of the UE may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of performing a measurement by a user equipment (UE) in a wireless communication system, the method comprising:
   determining a coverage enhancement (CE) level of the UE;
   receiving a legacy measurement configuration and a measurement activity configuration,
      wherein the legacy measurement configuration is a measurement configuration applied to a UE in a normal coverage, and the measurement activity configuration is a measurement configuration applied to a UE in an enhancement coverage; and
   based on the determination that the CE level is not zero, performing the measurement based on the measurement activity configuration,
   wherein the measurement activity configuration includes a measurement activity duration, a measurement inactivity duration, a measurement activity repetition period, and a measurement inactivity timer,
   wherein the measurement is performed only during the measurement activity duration based on the measurement activity duration and the measurement inactivity duration, and
   wherein the measurement is interrupted while the measurement inactivity timer is running based on the measurement inactivity timer.

2. The method of claim 1, wherein the measurement activity duration, the measurement inactivity duration, the measurement activity repetition period, and the measurement inactivity timer are provided per CE level.

3. The method of claim 1, wherein the measurement activity duration, the measurement inactivity duration, the measurement activity repetition period, and the measurement inactivity timer are provided as a single value regardless of the CE level.

4. The method of claim 3, further comprising:
   scaling, by the UE, the measurement activity duration, the measurement inactivity duration, the measurement activity repetition period, and the measurement inactivity timer based on the determined CE level of the UE.

5. The method of claim 1, wherein the measurement activity duration, the measurement inactivity duration, the measurement activity repetition period, and the measurement inactivity timer are provided per mobility state of the UE.

6. The method of claim 1, wherein the measurement activity duration, the measurement inactivity duration, the measurement activity repetition period, and a measurement inactivity timer are provided as a single value regardless of a mobility state of the UE.

7. The method of claim 6, further comprising:
   scaling, by the UE, the measurement activity duration, the measurement inactivity duration, the measurement activity repetition period, and the measurement inactivity timer based on the mobility state of the UE.

8. The method of claim 1, wherein the measurement inactivity timer starts when the measurement completes.

9. The method of claim 1, wherein the measurement is at least one of a measurement for a neighbor cell, a measurement for a neighbor frequency, a measurement for a serving cell, or a measurement for a serving frequency.

10. The method of claim 1, wherein the measurement activity configuration is a measurement configuration applied to a NarrowBand-IoT (NB-IoT) UE.

11. A user equipment (UE) for performing a measurement in a wireless communication system, the UE comprising:
   a memory; a transceiver; and a processor operatively coupled to the memory and the transceiver, wherein the processor is configured to:
   determine a coverage enhancement (CE) level of the UE;
   control the transceiver to receive a legacy measurement configuration and a measurement activity configuration, wherein the legacy measurement configuration is a measurement configuration applied to a UE in a normal coverage, and the measurement activity configuration is a measurement configuration applied to a UE in an enhancement coverage; and based on the determination that the CE level is not zero, perform the measurement based on the measurement activity configuration, wherein the measurement activity configuration includes a measurement activity duration, a measurement inactivity duration, a measurement activity repetition period, and a measurement inactivity timer, wherein the measurement is performed only during the measurement activity duration based on the measurement activity duration and the measurement inactivity duration, and wherein the measurement is interrupted while the measurement inactivity timer is running based on the measurement inactivity timer.

* * * * *